(12) United States Patent
Daya (10) Patent No.: US 8,334,603 B2
(45) Date of Patent: Dec. 18, 2012

(54) RAILWAY ACTUATED ENERGY GENERATING DEVICE

(76) Inventor: Arvind A. Daya, fayettevile, GA (US)

( * ) Notice: Subject to any disclaimer, the term of this patent is extended or adjusted under 35 U.S.C. 154(b) by 322 days.

(21) Appl. No.: 12/806,626

(22) Filed: Aug. 18, 2010

(65) Prior Publication Data

US 2012/0042738 A1    Feb. 23, 2012

(51) Int. Cl.
*F03G 7/00* (2006.01)
(52) U.S. Cl. .................................... 290/1 R; 290/1 C
(58) Field of Classification Search .................. 290/1 R, 290/1 C, 1 D; 74/25
See application file for complete search history.

(56) References Cited

U.S. PATENT DOCUMENTS

| | | | | |
|---|---|---|---|---|
| 1,916,873 A * | 7/1933 | Wiggins | .......................... | 185/39 |
| 4,130,064 A * | 12/1978 | Bridwell | ....................... | 104/154 |
| 6,362,534 B1 * | 3/2002 | Kaufman | ....................... | 290/1 R |
| 6,494,144 B1 * | 12/2002 | Perez Sanchez | .............. | 104/287 |
| 6,767,161 B1 * | 7/2004 | Calvo et al. | ..................... | 404/71 |
| 7,067,932 B1 * | 6/2006 | Ghassemi | ..................... | 290/1 R |
| 7,714,456 B1 * | 5/2010 | Daya | ............................ | 290/1 R |
| 8,123,431 B2 * | 2/2012 | Chen | .............................. | 404/71 |
| 2011/0037275 A1 * | 2/2011 | Peitzke et al. | ................ | 290/1 R |

* cited by examiner

*Primary Examiner* — Michael Zarroli (57) ABSTRACT

A rail train actuated energy generating device for the use along the path of a trains includes "Y" type actuator arm members for transverse disposed, parallel to rail tracks in a module mounted to the ground, the bottom of each of the actuator arm is tied to a shaft in the module with a one way clutch gears in the module's oil bath. As the train passes the actuator arms are pushed by "V" type attachments mounted to the edge of train's undercarriage parallel to the rail, thereby moving the actuator arms randomly as train passes. This motion of the actuator arm turns the shaft of the actuator arm with the one way clutch locked turning the gear in the module, thus turning the adjacent sprocket gears with chains. This process is repeated as the gears continue to turn upon contact that turns gearbox input shaft whereby the generator.

7 Claims, 8 Drawing Sheets

RAILWAY ACTUATED ENERGY GENERATING DEVICE

FIELD OF INVENTION

The present invention relates to capturing otherwise wasted energy to perform usable work and energy conservation. More particularly, the invention relates to an improved system for generating electric power in response to vehicular traffic on rail.

RELATED ART

There exist numerous prior devices which have been attempted to harness the potential energy contained in moving trains. Typically, these devices convert the potential energy into kinetic energy for providing useful work by means of pneumatic and or hydraulic means which can be used to run a generator. To date, such systems have failed to be adopted into current railway system. It is contemplated that such system lack necessary durability, efficiency or both and hence met resistance in adopting the same.

Nevertheless, there remain an ever need to conserve energy and reduce CO2 pollution particularly in countries where goods trains and subway trains are primary mode of transportation. Where there's a constant moving trains like subways. There remains significant amount of unused energy which can be tapped to offset current energy demands. Accordingly, the present invention improves upon the art in providing an efficient and low maintenance rail actuated energy device. Therefore, there is need for a system and method to reduce the CO2 pollution and generating electric power with an aid of the rail system.

SUMMARY OF INVENTION

It is a general object of the present invention to capture energy for useful purposes. Another object is to capture energy from moving trains through the use of instant invention. Still another object of the present invention is to provide an improved device for converting the potential energy development by moving trains into kinetic energy for performing useful work.

Accordingly, the present invention is directed to rail trains actuated energy generating device for use in a path of a train. The device includes an actuator arm as an elbow for transverse disposal on the side of the rail tracks, wherein the oil bath module is attached next to, along the outer side of and parallel to the rail track, the said oil bath module mounted in the ground with posts.

The actuator arm's base is attached on the inside of the oil bath module. The actuator arm includes a "Y" shaped member where the two top tips of the "Y" shaped member are attached with a shaft across each end with a roller supported by bearings. The top section of the "Y" shaped member shown in all the drawings is rectangular in shape. The two tips of the "Y" shaped member is facing at 90 degrees to the rail tracks and the base of the "Y" shaped member act as a elbow, the base is attached to a shaft with a return spring to return the actuator arm to the original position. A one way clutch gear is mounted on the same shaft which is enclosed in oil bath module with bearings at each end of the shaft, along with chains attached to one way clutch sprocket gear, a similar adjacent "Y" shaped actuator arm repeatedly attached. This assembly of one way clutch sprocket gears and chains are in an oil bath module. As train car passes over the said actuator arms, the actuator arm position moves from 2.00 pm position as on clock dial location to a 11.00 am position counterclockwise. This motion is caused by a permanently mounted "V" shaped attachments on the base of the undercarriage, mounted parallel to the rail tracks, on the outer edge of the undercarriage of the train car in line of the actuator arms. This motion of the actuator arms turns the shaft approximately 75+ degrees that is attached to the one way clutch gear. This process is repeated when second "V" shaped member attachment mounted adjacent to the first "V" shaped member approximately 3 to 5 meters apart on the same side of the train car make contact with the said actuator arm again, this is due to the return spring's action on base of actuator arm and the shaft. The rotation of all the gears in the oil bath module are connected to a single shaft which is extended outside transfer case to a gearbox which turns the generator, thus produce electricity. Other object and advantages of the invention will be apparent from the description and drawings herewith.

DETAILED DESCRIPTION OF PREFERRED EMBODIMENT

Figure 1:
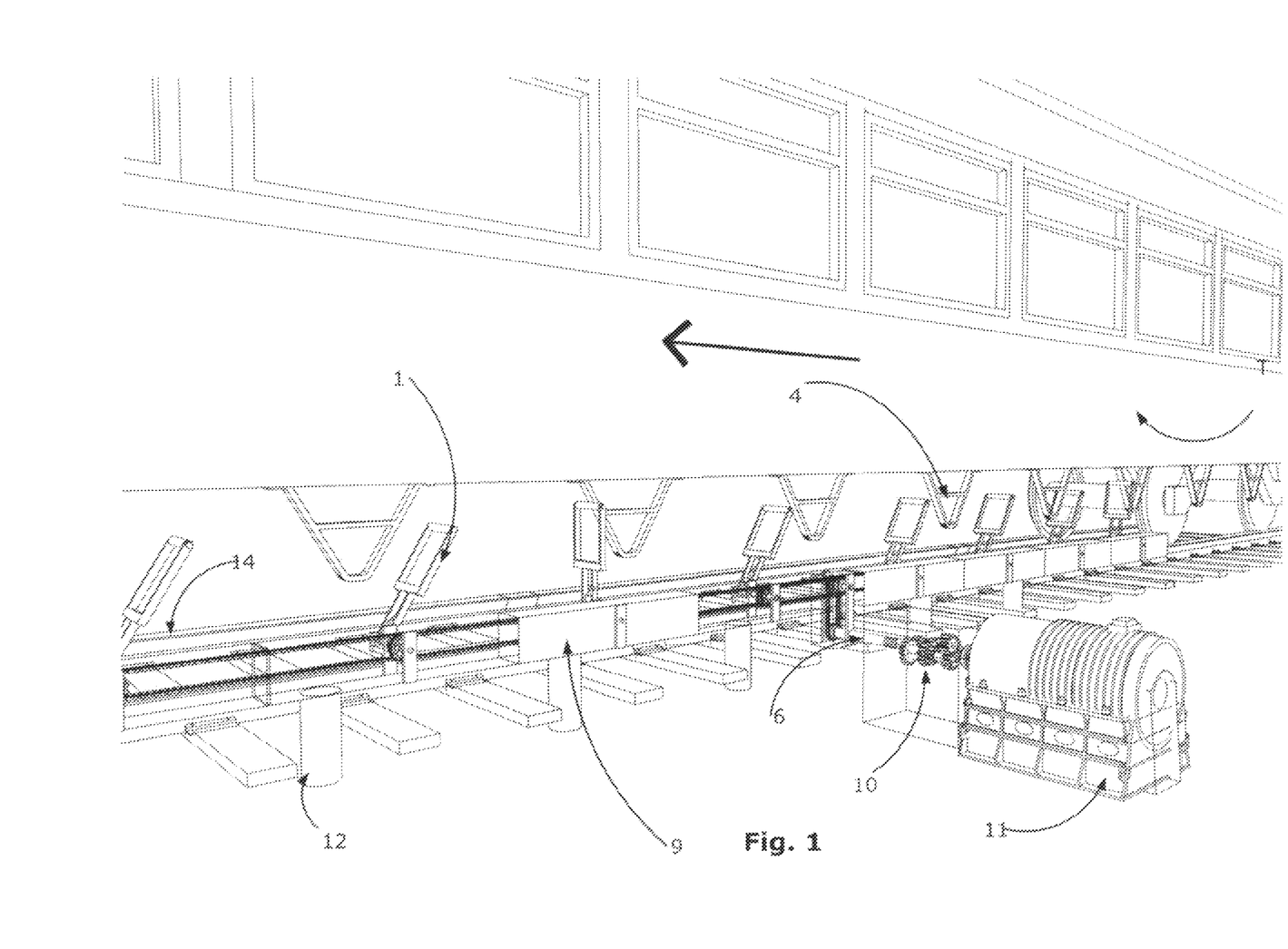
FIG. 1 is a diagrammatical representation of a train and the tracks incorporating the invention.
Figure 2A:
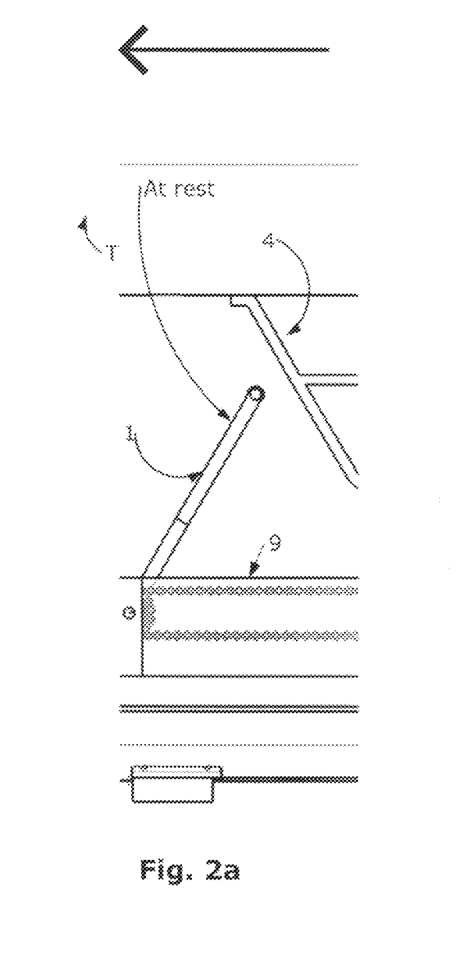
FIG. 2a. depicts side elevation of a actuator arm at rest position just before making contact with the "V" shape member mounted on the base of the undercarriage of the train as shown in FIG. 1.
Figure 2B:
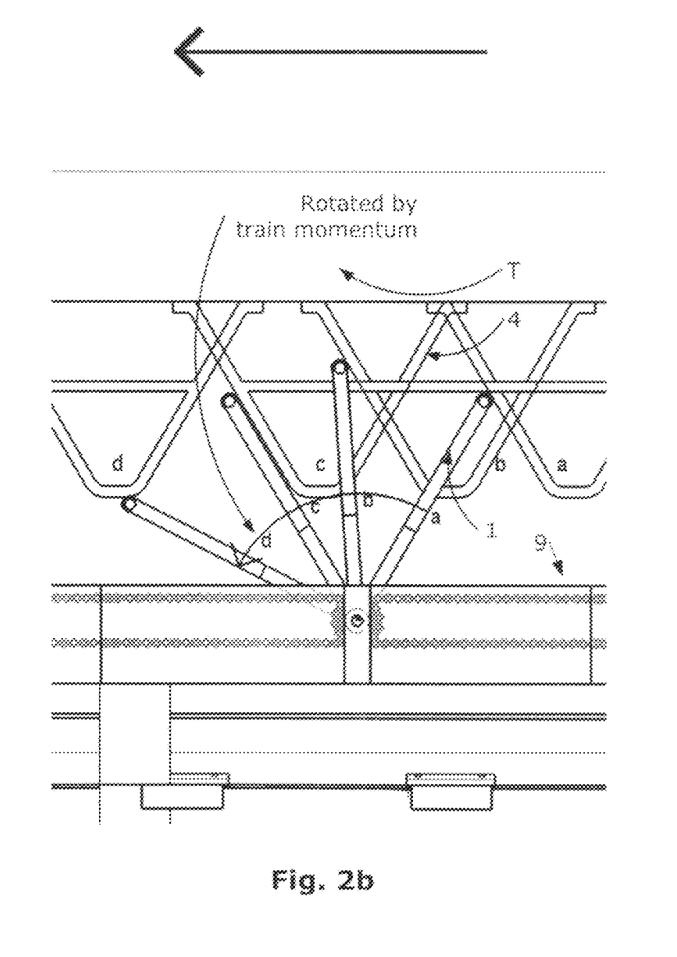
FIG. 2b. is a diagrammatical representation, a side elevation of actuator arms entire movement, from the time the actuator arm makes contact with the "V" shape member mounted on base of the undercarriage of the train car as shown in FIG. 1.
Figure 2C:
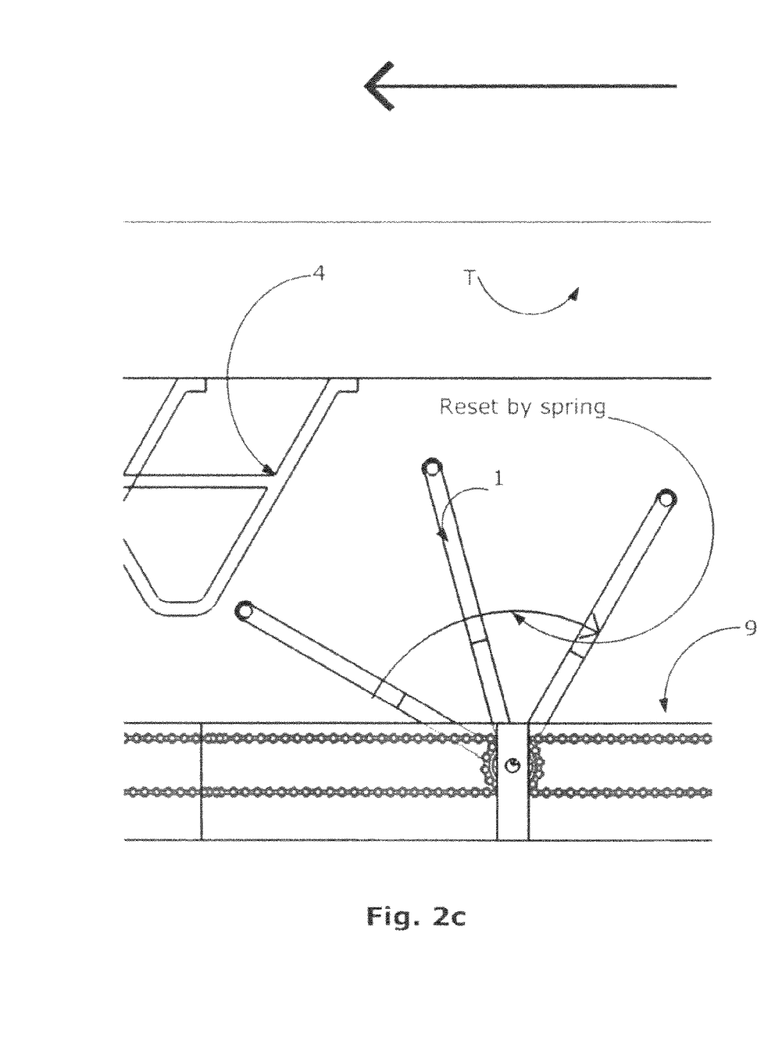
FIG. 2c. depicts actuator arm returning after making contact with the "V" shape member mounted on the base of the undercarriage of the train car with aid of the spring attached to the actuator arm as the train moves as shown in FIG. 1.
Figure 3:
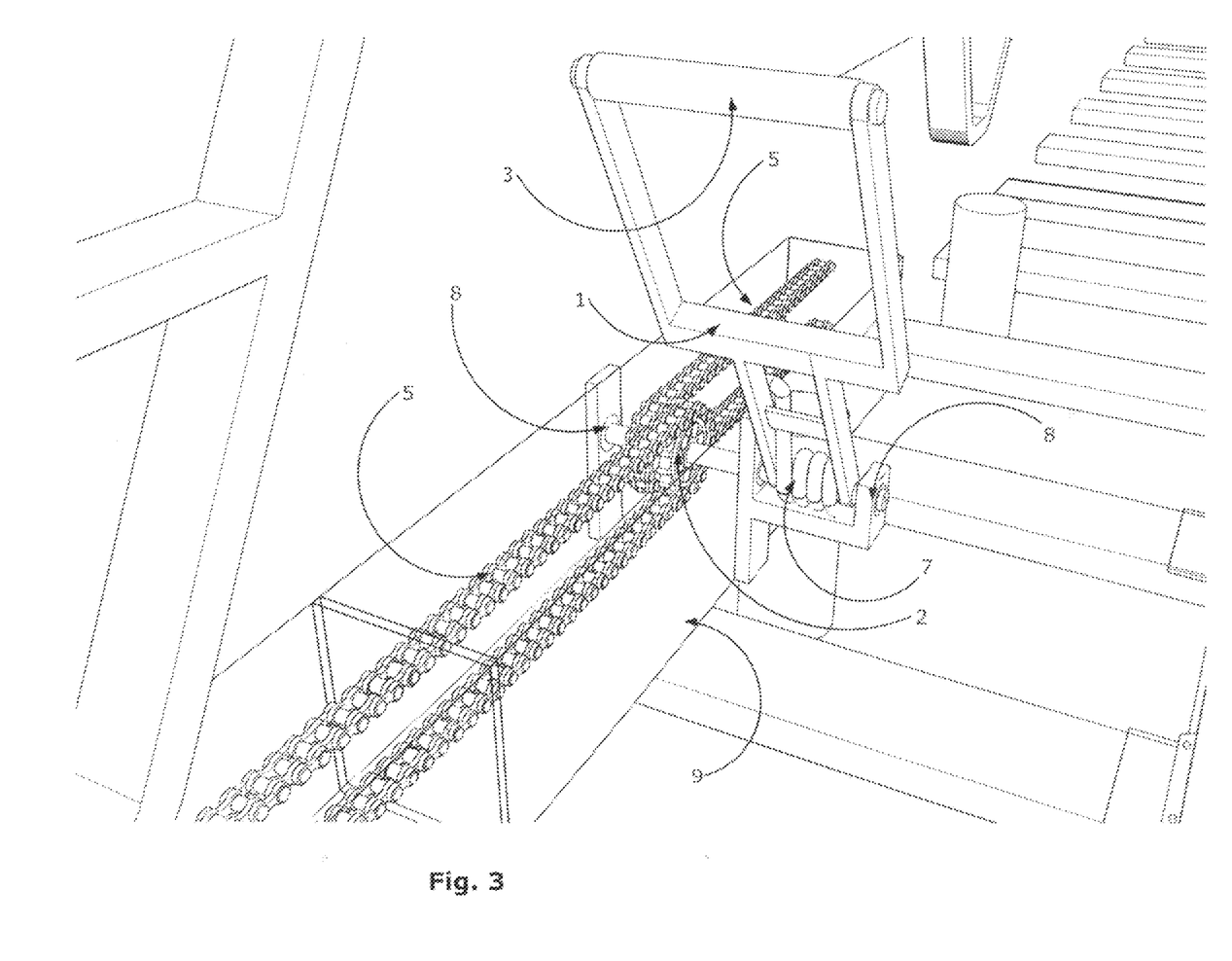
FIG. 3 depicts a typical module and actuator arm assembly of the actuator energy device.
Figure 3A:
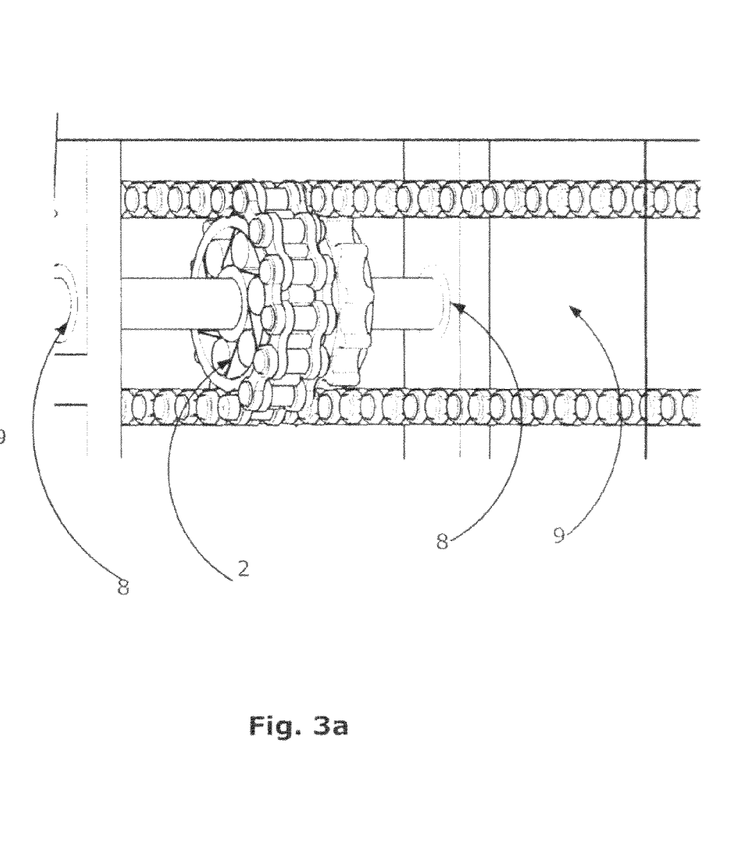
FIG. 3a. generally depicts a cross sectional view of a one way clutch gear attached to the drive shaft of the actuating arm in the module.
Figure 4:
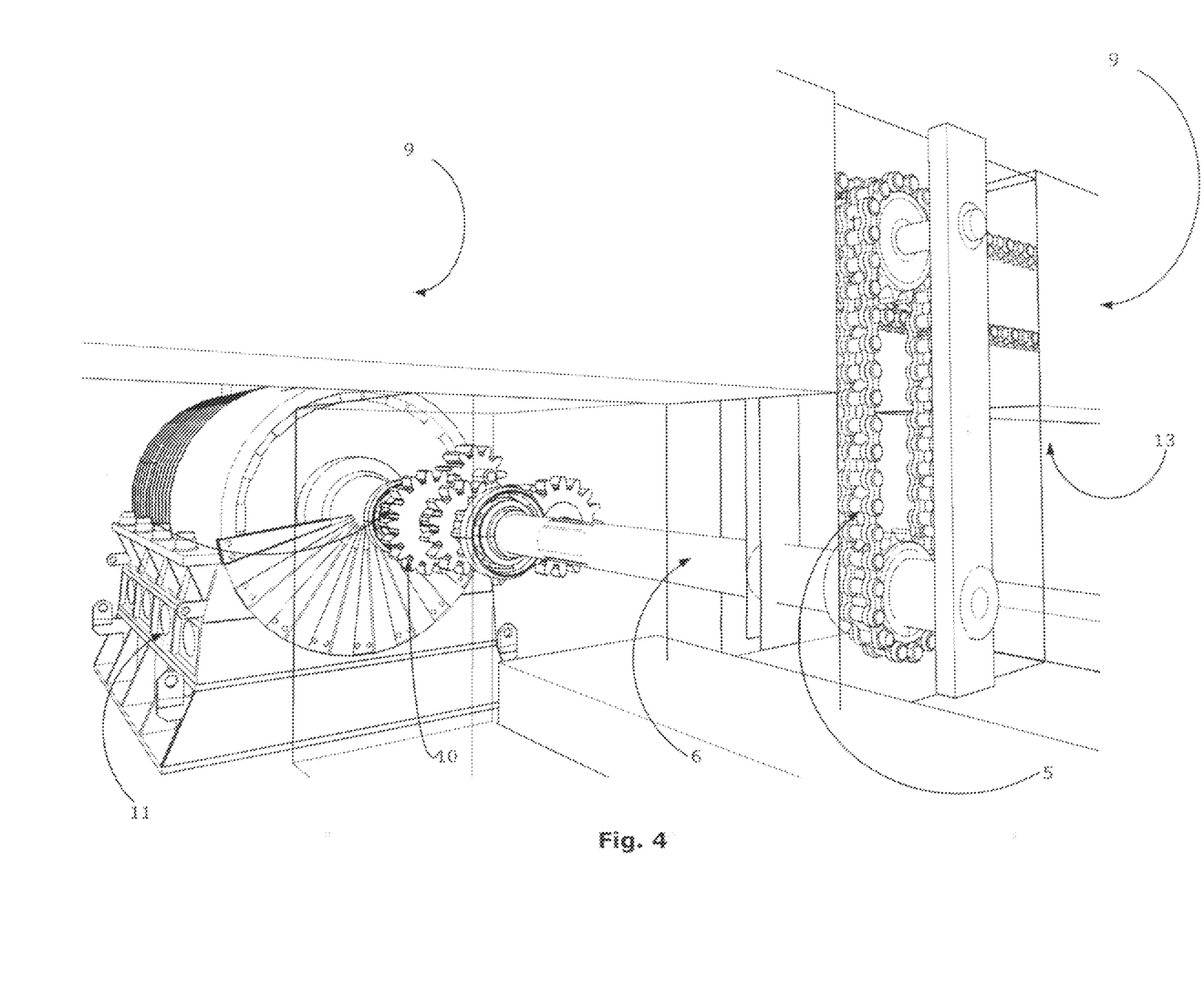
FIG. 4 depicts a transfer case attached to the gear box and generator.
Figure 5:
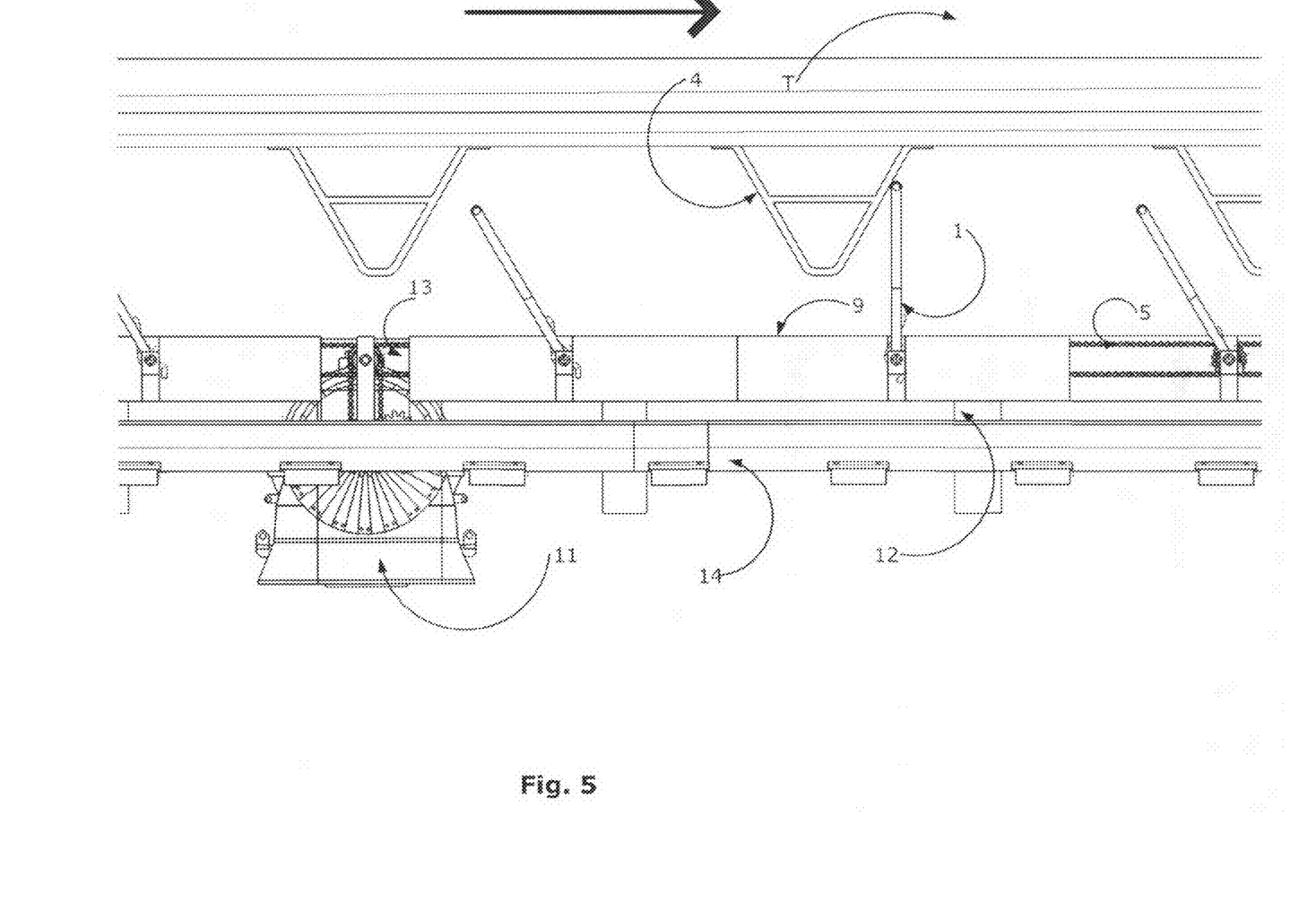
FIG. 5 is enlarged side elevation of trains undercarriage fixed "V" shape member showing randomly making contact with the actuator arms as the train moves.
Figure 6:
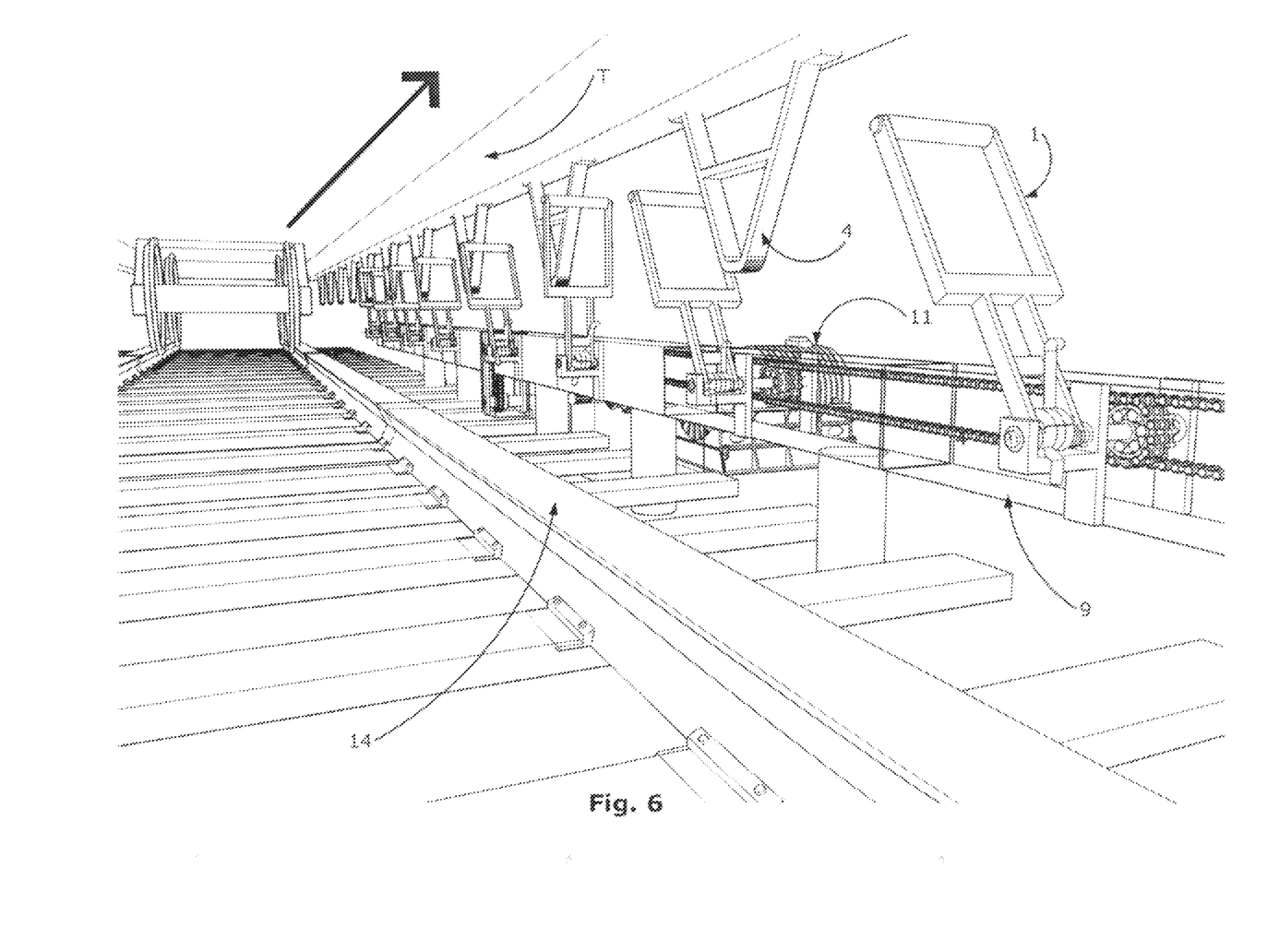
FIG. 6 depicts the trains undercarriage perspective view with actuator arm making contact with "V" type member attached to the train as train moves forward.
Figure 7:
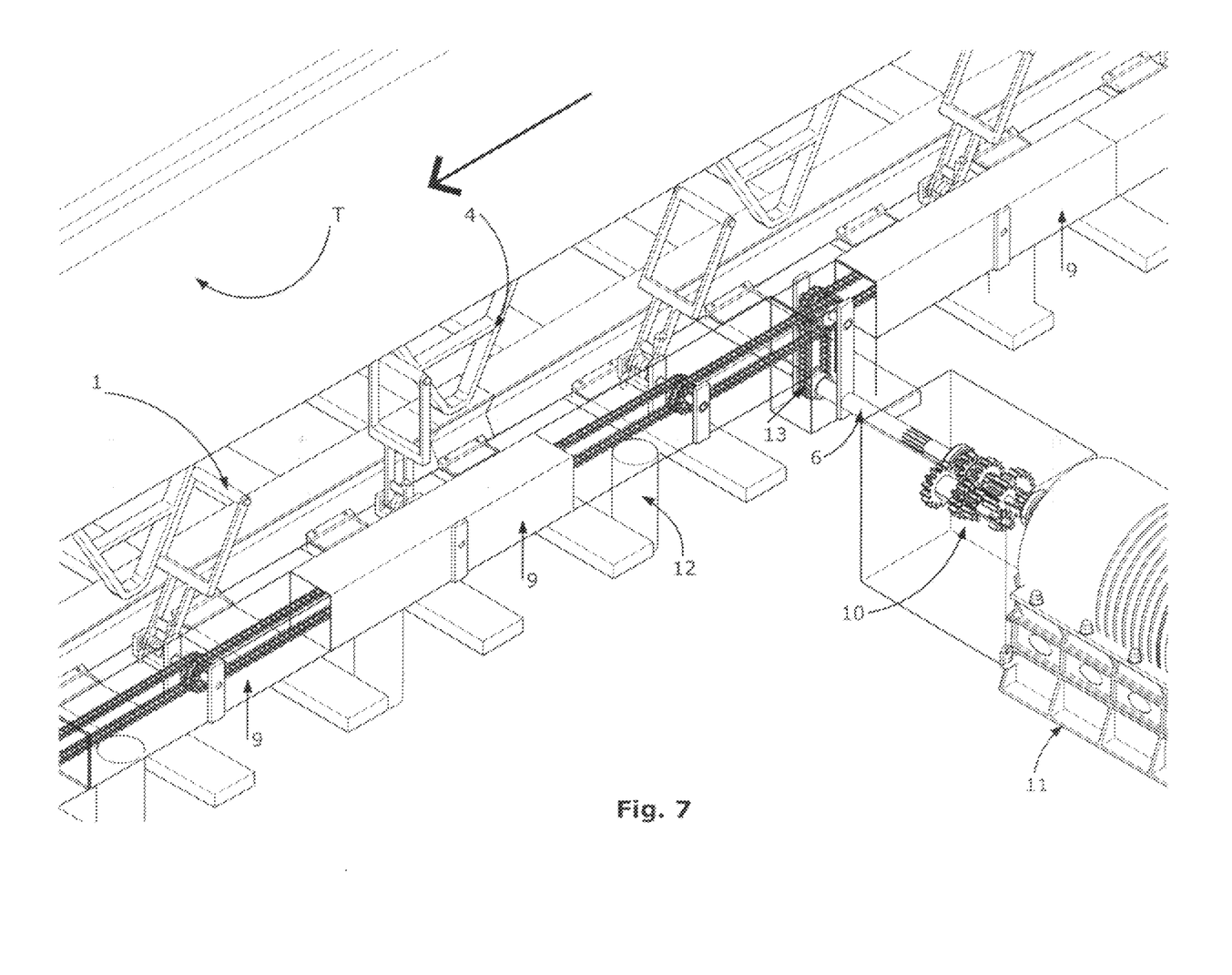
FIG. 7 depicts a axonometric view of the embodiment of the Invention.

Referring now to the present invention, the rail actuated energy device is generally designated by the numeral 10. In FIGS. 1-7, there is shown a train T which will have several "V" shaped type members 4 attached to the undercarriage of the rail cars on one side approximately three to five meters apart, operably disposed on the side of the rail track 14 several "Y" shaped actuators. Actuator arm 1 in alignment which is transverse disposed parallel to the rail tracks 14 in the oil bath module 9 that is mounted to a post 12 in the ground parallel to path of the train. Oil bath module 9 includes "Y" shaped members 1 actuator arms. The top two tips of "Y" shaped members is attached with a shaft not shown with a roller bearing sleeve, 3 thus as shown in all the drawings the upper section of "Y" shaped members FIG. 3 (#1) is a rectangular shaped. The base of actuator arm is rigidly attached to a shaft 8 with bearings not shown, the one way clutch sprocket gear assembly FIG. 3a (#2) is also rigidly attached to the same shaft 8 as shown in FIG. 3. Thus as the train moves over the device and the "V" shaped member 4 on the train makes contact with the actuator arm 1 as shown in FIG. 2a, the roller 3 glides on the "V" shaped member as shown in FIG. 2b, the actuator arm is moved forward as the train continues, rotating the shaft 8, turning the one way clutch sprocket gear FIG. 3a (#2) locked, approximately 75+ degrees, this further turns all sets of the one way clutch sprocket gears unlocked, (entire track of sprocket gears in the oil bath modules 9 are connected) thus turns same amount with an aid of chains 5. This rotation of all the one way clutch sprocket gears turns the shaft and rigid gear 6 attached in the transfer case 13. This further turns the gears in the gearbox 10 thereby turns the generator 11. The said "V" shaped member attached to the train moves away from the actuator arm, the arm returns to the original first position as shown in FIG. 2c with aid of a return spring 7, this process is repeated as the adjacent "V" shaped member 4 on the train makes contact with the same actuator arm 1 that returned and thereby repeating the process. It is also understood that the "V" shaped members 4 on the rail car and the actuator arms 1 are spaced out as shown in FIG. 5 whereby the moving force of the train is randomly applied to the actuator arms. The present invention provides for a highly efficient and durable device FIG. 7 which requires minimal service or maintenance. Further, the design provides for all weather use which is less susceptible to breakdown, clogging or jamming. Drive shaft 6 rotatably supported with bearings not shown contained a support mount 13. It is understood that the shaft 6 and gear are rigidly connected that is further connected to a gearbox and electric generator which in-turn is connected to the grid or hydrogen producing station.

By virtue of the instant invention, there is provided a device which can more realistically reduce our dependency on natural resource energy and stretch the life of such resources into the generations to come and benefit communities globally. Additionally, hydrogen can be generated with the generated energy used in vehicles of the future as well as utility demands, and charging station for battery powered vehicles, not to mention CO2 reduction.

It is understood that the foregoing description provides an example of the embodiments contemplated herein and those skilled in the art will grasp modification, derivations and improvements without departing from the principals of the present invention. The claims should therefore not be limited thereto but be afforded the scope of such modification, derivation and improvements.

What is claimed is:

1. A rail train actuated energy generating device for use along the path of trains to generate electrical power comprising;
    an oil bath module that contains a mechanism that operates the rail train actuator energy generating device;
    a plurality of "Y" shaped actuator arms are embedded in the module so as to turn a shaft in the module along with a gear, whereupon contact with "V" shaped members of a train, the actuator arms leverage the gears;
    the plurality of "Y" shaped actuator arms further includes roller bearing sleeves fixed on top of the said actuator arms, to absorb the friction caused by the train's motion upon impact on the actuator arms with the "V" shaped members;
    the module further contains a one way clutch sprocket gear assembly on each shaft attached to an actuator arm member to enable a ratchet action causing the sprocket gear to turn in one direction thus turning adjacent sprocket gears;
    the "Y" shaped actuator arms include a spring for biasing said actuator arm towards a first position immediately after the train cars "V" shaped member contacts the actuator arm;
    at least one shaft in the module protrudes out to connect to a gearbox whereby electricity is generated;
    the plurality of "V" shaped members are attached to the outer undercarriage of the train and are in alignment with the "Y" shaped actuator arms in the oil module thereby making contact with the actuator arms as the train passes through;
    each "Y" shaped member in the oil bath module is attached to an individual set of shafts and one way clutch sprocket gears.

2. A rail train actuated energy generating device of claim 1 wherein the oil bath module is
    parallel to the rails, anchored to the ground.

3. A rail train actuated energy generating device of claim 1 wherein each of the one way clutch
    sprocket gears in the oil bath module are spaced out, as to allow the time required for
    the actuator arm to reset to the first rest position while the train is in motion.

4. A rail train actuated energy generating device of claim 1 wherein the ratchet, reciprocating action of the actuator arms causes the one way clutch sprocket gears to turn thus causing the rest of the sprocket gears to transfer the continuous rotation to the gearbox as the train passes.

5. A rail train actuated energy generating device of claim 1 wherein the actuator arms in the oil bath module and the "V" shaped members attached to the train's undercarriage are in tandem relationship to each other as the train moves.

6. A rail train actuated energy generating device of claim 1 wherein the first position is the rest position of the actuator arm.

7. A rail train actuated energy generating device of claim 1 wherein a second position of the actuator arm is characterized to be proximate below the "V" shaped member attached to the train, whereby when actuator arm moves from the rest, first position to the second position the moving train causes the ratchet action.

* * * * *